E. C. SMITH.
FORE TRUCK FOR HARVESTERS AND THE LIKE.
APPLICATION FILED SEPT. 20, 1916.
1,217,116.
Patented Feb. 20, 1917.
2 SHEETS—SHEET 1.
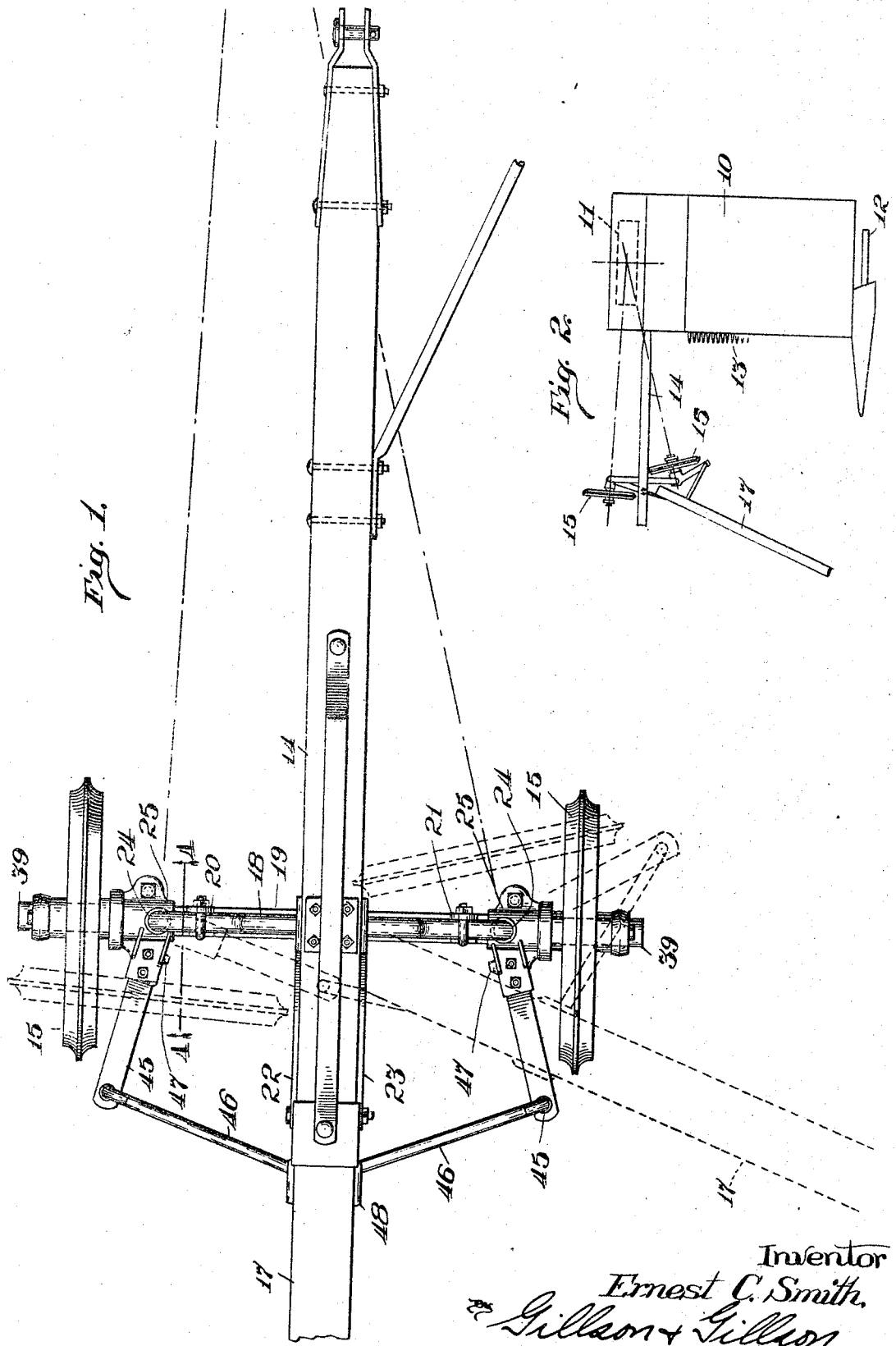
Inventor
Ernest C. Smith.
by Gillson & Gillson
Attorneys E. C. SMITH.
FORE TRUCK FOR HARVESTERS AND THE LIKE.
APPLICATION FILED SEPT. 20, 1916.
1,217,116.
Patented Feb. 20, 1917.
2 SHEETS—SHEET 2.
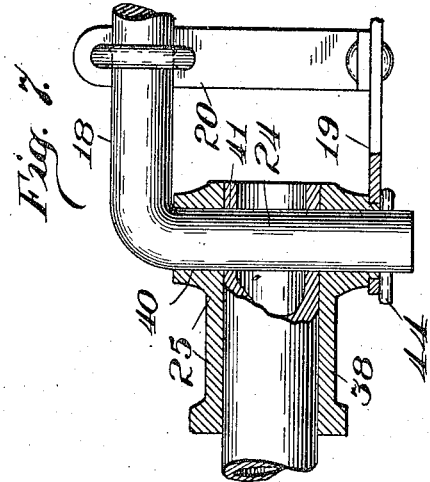
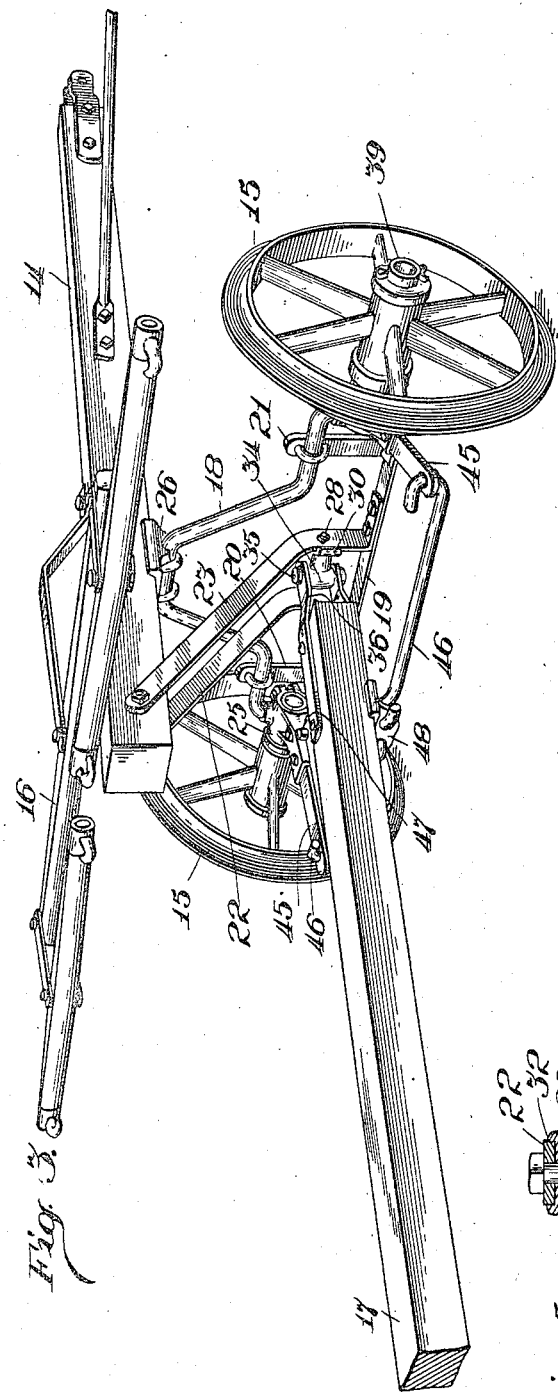
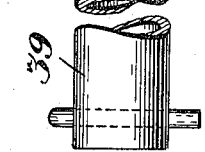
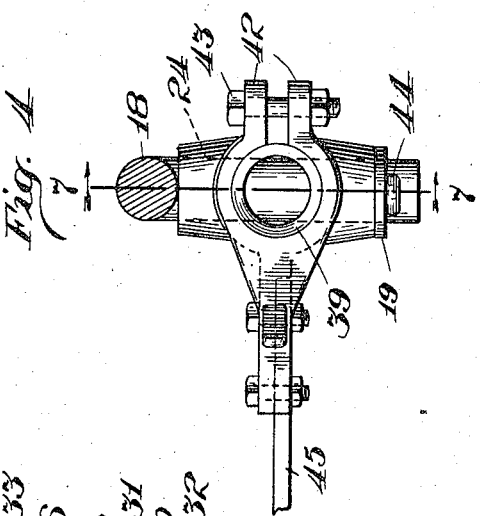
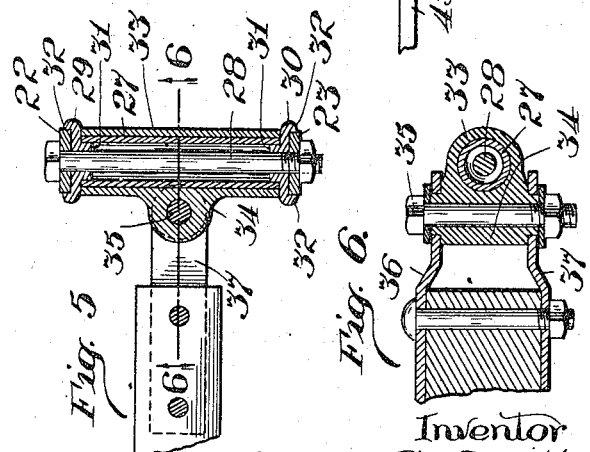
Inventor
Ernest C. Smith.
By Gillson & Gillson
Attorneys

UNITED STATES PATENT OFFICE.

ERNEST C. SMITH, OF HOOSICK FALLS, NEW YORK, ASSIGNOR TO WALTER A. WOOD MOWING & REAPING MACHINE CO., OF HOOSICK FALLS, NEW YORK, A CORPORATION OF NEW YORK.

FORE-TRUCK FOR HARVESTERS AND THE LIKE.

1,217,116.   Specification of Letters Patent.   Patented Feb. 20, 1917.

Application filed September 20, 1916. Serial No. 121,169.

*To all whom it may concern:*

Be it known that I, ERNEST C. SMITH, a citizen of the United States, and resident of Hoosick Falls, county of Rensselaer, and State of New York, have invented certain new and useful Improvements in Fore-Trucks for Harvesters and the like, of which the following is a specification and which are illustrated in the accompanying drawings, forming a part thereof.

The invention relates to wheeled trucks used with harvesting machines and the like for relieving the team from the support of any part of the weight of the machine and from the side draft and pole lashing, as also to provide for a more favorable application of the draft and to assist in guiding the machine. The invention contemplates an improved mechanical construction of the truck and the object of the invention is to provide a truck which is of great strength and effective in operation but formed from a few readily assembled parts.

In the accompanying drawings,

Figure 1 is a plan view of the improved truck showing some details of a harvesting machine to which the truck may be applied and with a different position of some of the parts indicated by dotted lines;

Fig. 2 is a plan view of a harvesting machine with the improved truck applied thereto, the parts of the truck being shown in the position which they assume during the turning of the harvesting machine.

Fig. 3 is a perspective view of the improved truck;

Fig. 4 is a detail sectional view taken on the line 4—4 of Fig. 1;

Fig. 5 is a detail plan sectional view showing the manner in which the pole is connected with the truck;

Fig. 6 is a detail sectional view taken on the line 6—6 of Fig. 5, and

Fig. 7 is a detail sectional view taken on the line 7—7 of Fig. 4.

The drawings illustrate the use of the improved truck in connection with a harvesting machine which is generally designated 10, and which comprises the usual bull wheel 11, grain wheel 12, sickle bar 13 and stub tongue 14. As shown, the truck frame is rigidly connected with the stub tongue 14 and the carrying wheels 15 are swingingly mounted at opposite sides of the frame. An evener, as 16, of the draft appliance will usually be mounted on the stub tongue 14, in which case only the pole, as 17, is connected with the improved truck.

The truck frame preferably comprises a stout arch 18, a transverse brace 19, a pair of upright braces 20, 21, and a pair of inclined longitudinal braces 22, 23. The arch 18, has down-turned ends 24 which are outwardly off-set from the intermediate portions of the arch, and a bracket, generally designated 25, is swingingly mounted upon each of the said down-turned ends of the arch for receiving the corresponding carrying wheel 15. The transverse brace 19 extends horizontally between the two ends of the arch 18 while the two upright braces 20, 21 extend between and are rigidly connected with the brace 19 and arch 18, one adjacent each side of the truck frame.

In use, the arch 18 is firmly secured against the underside of the stub tongue 14, as by means of a clamp bracket 26. The inclined braces 23, 24, are also connected with the stub tongue 14, one on each side, and these braces extend diagonally for their point of connection with the stub tongue to the transverse brace 19.

The inclined braces 22, 23 preferably serve for receiving a connection with the pole 17 which permits of both horizontal and vertical swinging of the pole. As shown, a tubular spacing element 27 is rigidly held between the two inclined braces 22, 23 near their lower ends. This spacing element is most conveniently secured in position by the use of a clamping bolt 28 and washers 29, 30. The clamping bolt 28 extends through the bore of the spacing element 27 and through both of the washers 29, 30, and braces 22, 23. The washers 29, 30 are located at opposite ends of the spacing element 27 and each washer is desirably formed at one side with an annular flange 31 for entering the bore of the spacing element and at the other side with a pair of marginal flanges 32 for engagement with the two edges of the corresponding brace. A sleeve 33 incloses the spacing element 37 and turns upon it between the two washers 29, 30. This sleeve is formed with a hub 34 at one side, and a pair of straps 36, 37, projecting from the rear end of the pole 17, have a pivotal engagement with the hub 34 at its upper and lower ends. A clamping bolt 35 is extended vertically through the hub 34 and straps 36, 37, to prevent disengagement of the straps from the ends of the hub.

Each of the wheel brackets 25 preferably comprises a tubular casting 38 and a tubular stub axle 39. The stub axle 39 extends through and beyond the casting 38 and both the casting 38 and stub axle 39 are apertured, as at 40 or 41, for receiving the corresponding down-turned end portion 24 of the arch 18. This construction not only provides for the pivotal mounting of the wheel brackets upon the ends of the arch 18, but it also effectually serves to prevent any end-wise displacement of each stub axle 39 in the corresponding casting 38. As a further means for securing the stub axles 39 within the corresponding castings 38, each casting 38 is preferably made in the form of clamps with lugs 42 at one side for the reception of a clamping bolt, as 43. The engagement of each end of the transverse brace 19 with the corresponding down-turned end 24 of the arch 18 is preferably below the corresponding wheel bracket 25. As shown, the transverse brace 19 is apertured at each end to receive the arch and a cotter, as 44, is passed through each end of the axle below the brace.

In order that the horizontally swinging movement of the pole 17 may be communicated to the wheels 15, each bracket 25 is provided with a crank arm 45 and these crank arms are connected with the pole 17 through links, as 46. As shown, the casting 38 of each bracket 25 is formed with a clamp socket for receiving one end of the corresponding crank arm 45.

To permit a short turn to be made with the harvesting machine, as 10, it is desirable that the truck wheels, as 15, may be swung to positions in which they travel about the bull wheel 11 as a center. For this purpose it is important that the swinging movements of the truck wheels 15, should exceed those of the pole 17. This is conveniently accomplished by connecting the links 46 with the pole 17 at a distance from the axis of the horizontal swinging movements of the pole which is greater than the length of the crank arms 45. With the parts proportioned as shown the swinging of the pole 17, between the positions illustrated by full lines in Figs. 1 and 2, serves for swinging the truck wheels 15, through the greater angle indicated by the two positions of the wheels shown in the drawings. When the truck wheels and pole occupy the positions indicated by dotted lines in Fig. 1, and by full lines in Fig. 2, the turning of the harvesting machine 10 is accomplished without dragging the bull wheel 11 laterally over the ground and without movement of the sickle bar 13 into the standing grain. Preferably the casting 38 of each wheel bracket 25 is formed with a stop lug 47 which comes into engagement with the adjacent upright brace 20 or 21 when the corresponding wheel 15 has been swung inwardly to the extent required for the turning of the harvesting machine in the manner just described. An apertured bracket lug 48, secured against the underside of the pole 17 serves for the attachment thereto of the adjacent ends of the links 46.

The construction is composed of parts which are readily assembled and which, when assembled, are rigidly connected. A strong and durable construction is accordingly provided without undue cost of manufacture and the truck is effective in operation. A feature of the construction provides that when the stub axles 39 have become worn by the turning of the wheels 15, thereon, they may be drilled at their outer ends to receive the arch 18 and reversed in the castings 38.

I claim as my invention,—

1. A fore truck for harvesters and the like comprising, in combination, a rigid arch adapted at its crown for stationary connection with the stub tongue of the harvester, wheel brackets swingingly mounted upon the ends of the arch, a transverse brace connecting the ends of the arch below the wheel brackets, an inclined longitudinal brace extending upwardly from the said transverse brace and adapted at its upper end for connection with the stub tongue of the harvester in front of the point of attachment thereto of the arch, a pole having swiveled connection with said inclined brace, and steering connections between the pole and the wheel brackets.

2. In a fore truck for harvesters and the like, in combination, a rigid truck frame comprising a transverse arch adapted at its crown for stationary connection with the stub tongue of the harvester, a transverse brace connecting the ends of the arch and an inclined longitudinal brace extending upwardly from the transverse brace and adapted at its upper end for connection with the stub tongue of the harvester at a distance from the point of attachment thereto of the arch, wheel brackets swingingly mounted upon the ends of the frame arch above the transverse brace, a pole having swiveled connection with the truck frame, and steering connections between the pole and the wheel brackets.

3. In a fore truck for harvesters and the like, in combination, a rigid truck frame comprising a transverse arch adapted at its crown for stationary connection with the stub tongue of the harvester and having at each side an intermediate horizontal portion, a transverse brace connecting the ends of the arch, upright braces connecting the transverse brace with the intermediate horizontal portions of the arch and an inclined longitudinal brace extending upwardly from the transverse brace and adapted at its upper end for connection with the stub tongue of the harvester at a distance from the point of attachment thereto of the arch, wheel brackets swingingly mounted upon the ends of the frame arch above the transverse brace, a pole having swiveled connection with the truck frame and steering connections between the pole and the wheel brackets.

4. A fore truck for harvesters and the like comprising, in combination, a rigid arch adapted at its crown for stationary connection with the stub tongue of the harvester, wheel brackets swingingly mounted upon the ends of the arch, a transverse brace connecting the ends of the arch below the wheel brackets, a pair of inclined parallel braces extending upwardly from the transverse brace for connection at their upper ends with the stub tongue of the harvester at opposite sides of the same and at a distance from the point of attachment thereto of the arch, a transverse bolt rigidly connecting the two inclined braces, a pole having swiveled connection with the said bolt and steering connections between the pole and the wheel brackets.

5. A fore truck for harvesters and the like, comprising, in combination, a rigid truck frame having an upright round rod at each side, a pair of telescopically united stub axles and tubular brackets, each stub axle being longer than the corresponding bracket and each stub axle and bracket being formed with registering vertical apertures through both of which one of the said upright round rods of the truck frame is extended to prevent relative end-wise displacement of the stub axle and bracket and provide a swinging support for the axle and bracket upon the corresponding side of the truck frame, and a carrying wheel mounted upon the projecting portion of each of the said stub axles.

6. A fore truck for harvesters and the like comprising, in combination, a rigid transverse arch having at each side an intermediate horizontal portion which is located at a substantial distance below the crown of the arch but above the level of the adjacent end of the arch, wheel brackets applied to the ends of the arch, a horizontal brace connecting the ends of the arch below the wheel brackets and upright braces connecting the said horizontal brace with the said intermediate horizontal portions of the arch.

ERNEST C. SMITH.